US009185265B2

(12) United States Patent
Tada

(10) Patent No.: US 9,185,265 B2
(45) Date of Patent: Nov. 10, 2015

(54) IMAGE PROCESSING METHOD AND IMAGE PROCESSING APPARATUS FOR PERFORMING A TONE CORRECTION TO ACQUIRE A COMBINED IMAGE

(75) Inventor: Junji Tada, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 28 days.

(21) Appl. No.: 13/318,077

(22) PCT Filed: Apr. 22, 2010

(86) PCT No.: PCT/JP2010/002911
§ 371 (c)(1),
(2), (4) Date: Oct. 28, 2011

(87) PCT Pub. No.: WO2010/128578
PCT Pub. Date: Nov. 11, 2010

(65) Prior Publication Data
US 2012/0045133 A1 Feb. 23, 2012

(30) Foreign Application Priority Data

May 7, 2009 (JP) ................................. 2009-112788

(51) Int. Cl.
*G06K 9/46* (2006.01)
*H04N 1/407* (2006.01)
*G06T 5/00* (2006.01)
*G06T 5/40* (2006.01)
*G06T 5/50* (2006.01)
*H04N 5/20* (2006.01)

(52) U.S. Cl.
CPC .............. *H04N 1/4074* (2013.01); *G06T 5/008* (2013.01); *G06T 5/40* (2013.01); *G06T 5/50* (2013.01); *H04N 5/20* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS 5,828,793 A 10/1998 Mann
2004/0001639 A1 1/2004 Ohno (Continued)

FOREIGN PATENT DOCUMENTS

| CN | 1197348 A | 10/1998 |
| EP | 866608 A2 | 9/1998 |
| EP | 1248453 A2 | 10/2002 |
| EP | 2031868 A2 | 3/2009 |
| EP | 2043361 A1 | 4/2009 |

(Continued)

OTHER PUBLICATIONS

Kao, Wen-Chung. "High dynamic range imaging by fusing multiple raw images and tone reproduction." Consumer Electronics, IEEE Transactions on 54.1 (2008): 10-15.*

*Primary Examiner* — Nirav G Patel
(74) *Attorney, Agent, or Firm* — Canon USA, Inc. IP Division

(57) ABSTRACT

According to the present invention, there is provided an image processing method that performs a tone correction to obtain a combined image with suitable brightness and contrast when a plurality of image data pieces is combined, and an image processing apparatus that can execute the method. The image processing method includes detecting brightness distribution for each of the plurality of image data pieces, calculating a characteristic amount of each brightness distribution from the brightness distribution, and acquiring a correction amount for a tone correction executed to the combined image data based on the obtained characteristic amount of the brightness distribution.

5 Claims, 6 Drawing Sheets

(56) References Cited

U.S. PATENT DOCUMENTS

| | | | |
|---|---|---|---|
| 2004/0004666 A1 | 1/2004 | Sano | |
| 2004/0207734 A1 | 10/2004 | Horiuchi | |
| 2004/0234153 A1 | 11/2004 | Nakami | |
| 2005/0280869 A1 | 12/2005 | Kameyama | |
| 2006/0083420 A1* | 4/2006 | Kawaguchi | 382/149 |
| 2007/0132858 A1* | 6/2007 | Chiba et al. | 348/222.1 |
| 2009/0231467 A1* | 9/2009 | Yamashita et al. | 348/234 |
| 2009/0232416 A1* | 9/2009 | Murashita et al. | 382/294 |
| 2009/0262983 A1* | 10/2009 | Nakami | 382/103 |
| 2011/0164828 A1* | 7/2011 | Iwata | 382/274 |

FOREIGN PATENT DOCUMENTS

| | | | | |
|---|---|---|---|---|
| JP | 11-331598 A | | 11/1999 | |
| JP | 2000013616 A | * | 1/2000 | H04N 1/148 |
| JP | 2002-290707 A | | 10/2002 | |
| JP | 2003-46859 A | | 2/2003 | |
| JP | 2003046859 A | * | 2/2003 | H04N 5/243 |
| JP | 2004-198512 A | | 7/2004 | |
| JP | 2004-297701 A | | 10/2004 | |
| JP | 2005-130484 A | | 5/2005 | |
| JP | 2005-260630 A | | 9/2005 | |
| JP | 2008-060623 A | | 3/2008 | |

* cited by examiner

IMAGE PROCESSING METHOD AND IMAGE PROCESSING APPARATUS FOR PERFORMING A TONE CORRECTION TO ACQUIRE A COMBINED IMAGE

TECHNICAL FIELD

The present invention relates to processing for obtaining a piece of image data by adding and combining a plurality of pieces of image data.

BACKGROUND ART

There is an image processing method in which a plurality of images are added and combined to form one image. For example, Japanese Patent Application Laid-Open No. 2003-46859 discusses a method of a tone conversion for appropriately compressing a gradation number of a combined image in the method in which the same subject is imaged a plurality of times with a different exposure amount by a digital camera, and these images are combined to form a combined image having a wide dynamic range.

There has also been discussed a method in which a different subject is imaged a plurality of times, and the plurality of images are added and combined to express a plurality of subjects in one image. In this case, there are two methods: a method in which each of the images is imaged with an appropriate exposure and added, and a method in which each of the images is imaged with an exposure of "1/(the number of times of imaging)" and added. When the background is dark, the former method is effective to ensure the appropriate brightness of each subject, while the latter method is effective to ensure the appropriate exposure after the combining process, during normal image capturing.

When a plurality of image data pieces in which different subjects are captured is combined, and the image data pieces are obtained by the normal image capturing which is not in the dark background, a contrast of the combined image is often reduced if it is obtained only by the simple addition and combination described above, and the each subject may look like see-through in most cases.

CITATION LIST

Patent Literature

PTL 1: Japanese Patent Application Laid-Open No, 2003-46859

SUMMARY OF INVENTION

The present invention is directed to an image processing method that performs a tone correction to acquire a combined image having suitable brightness and contrast, and an image processing apparatus that can execute the method.

According to an aspect of the present invention, a method for image processing for obtaining a piece of combined image data by combining a plurality of image data pieces includes detecting brightness distribution for each of the plurality of image data pieces, calculating a characteristic amount of each brightness distribution from the brightness distribution, and acquiring a correction amount for a tone correction executed to the combined image data based on the obtained characteristic amount of the brightness distribution.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Examples

Figure 1:
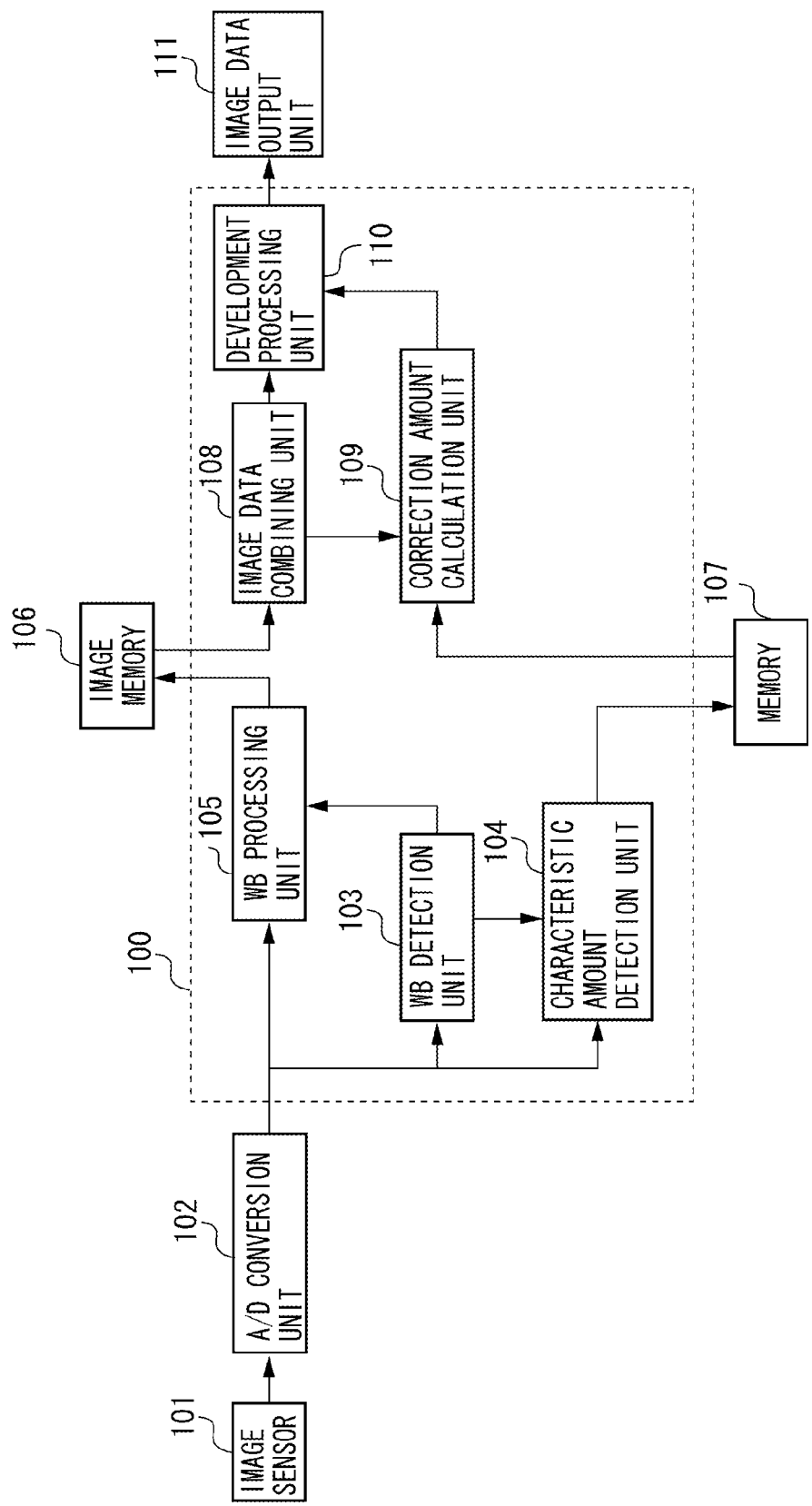
FIG. 1 is a block diagram illustrating a digital camera that can realize an image processing apparatus according to the present invention.

FIG. 1 is a block diagram of a digital camera that can realize an image processing apparatus according to the present invention.

In FIG. 1, an optical image of a subject which has passed through a photographic lens (not illustrated) is formed on an image sensor 101 (image input unit), and converted into charges according to its light quantity.

The charges converted by a photoelectric conversion element are output to an analog-digital (A/D) conversion unit 102 from the image sensor 101 as an electric signal, and converted into a digital signal (image data) by A/D conversion processing. The digital signal output from the A/D conversion unit 102 is processed at a central processing unit (CPU) 100. Then, the digital signal is transmitted to an image data output unit 111 to be displayed. The processing in the CPU 100 is stored in a memory (not illustrated) as a program, and executed by the CPU 100. The program to be executed may be externally recorded on a recording medium or the like. The processing described below is executed in the CPU 100.

The digital signal output from the A/D conversion unit 102 is transmitted to a white balance (WB) detection unit 103, a characteristic amount detection unit 104 (brightness distribution detection unit, characteristic amount calculation unit), and a WB processing unit 105, respectively. The WB detection unit 103 performs WB detection. In this process, a gain of a white balance suitable for the captured image is calculated from the captured image data. The gain of the white balance may be calculated by a conventional method. In the WB processing unit 105, the gain of the white balance obtained by the WB detection unit 103 is integrated to each pixel value of red-green-blue (RGB) of the image. The image to which the gain of the white balance is integrated is temporarily stored in an image memory 106.

The image data and the characteristic amount of the image are recorded respectively to the image memory 106 and a memory 107 for each of a plurality of times of imaging. When a predetermined number of image data pieces are obtained, an image data combining unit 108 adds and combines the image data pieces recorded in the image memory 106.

A correction amount calculation unit 109 (correction amount acquisition unit) calculates a tone correction amount based on the data of the characteristic amount of each image stored in the memory 107 and the data of the characteristic amount of the combined image. The calculation method of the tone correction amount will be described below. A development processing unit 110 performs tone correction to the combined image data using the tone correction amount transmitted from the correction amount calculation unit 109, and then, the corrected combined image data is transmitted to the image data output unit 111.

In the present exemplary embodiment, the tone correction amount is calculated based on the data of the characteristic amount of each image recorded in the memory 107 and the data of the characteristic amount of the combined image. However, the tone correction amount may be calculated from table data using the characteristic amount of each image, and information about the tone correction amount may be acquired.

Figure 2:
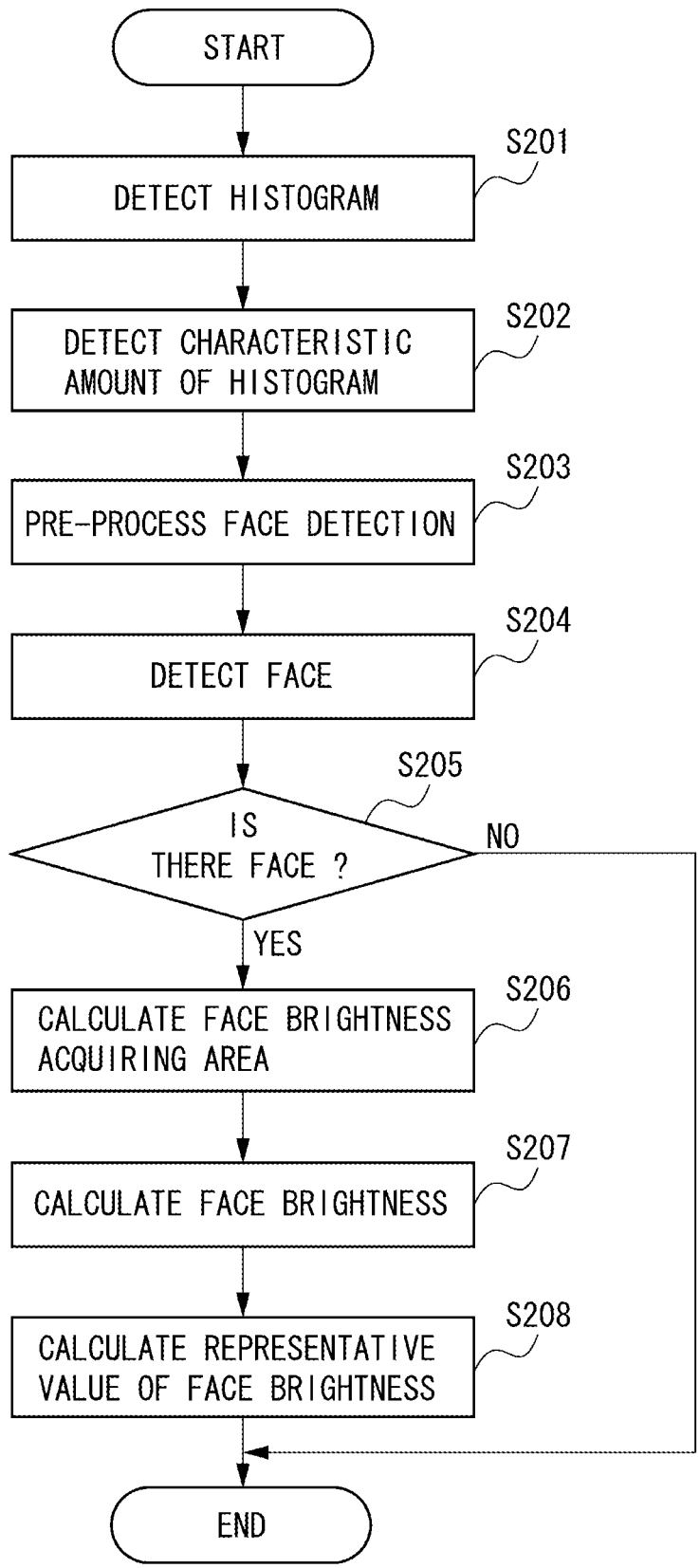
FIG. 2 illustrates a flowchart of characteristic amount detecting processing.

FIG. 2 is a flowchart illustrating the processing of the detection of the characteristic amount performed to each image data at the characteristic amount detection unit 104.

In step S201 in FIG. 2, a histogram is detected. In step S201, the gain of WB calculated by the WB detection unit 103 is applied to all captured image data pieces to detect a histogram to which gamma processing is performed as brightness distribution. The gamma processing may be the conventional processing using a look-up table. A range in which the histogram is detected may be an area where the end of the image data is cut.

In step S202, a characteristic amount of the histogram is detected. In the present exemplary embodiment, a value (SD) to which a pixel that has a cumulative frequency of 1% from a dark (shadow) side belongs, and a value (HL) to which a pixel that has a cumulative frequency of 1% from a bright (highlight) side belongs, are obtained in the histogram.

In step S203, a pre-processing of face detection is performed. In this processing, a compression processing or gamma processing is performed on the input image to facilitate the detection of a face included in the image.

In step S204, face detection for detecting a face area in the image is executed. There is no particular limitation on the method for detecting the face. An arbitrary and conventional method can be applied to the face detection. A conventional face detecting technique includes a method based on a learning utilizing a neutral network, and a method in which a section having a characteristic shape, such as eye, nose, and mouth, is found out from the image by using a template matching, and the image is regarded as a face if a degree of similarity is high. Additionally, various methods have been discussed including a method in which an image characteristic amount, such as a skin color or a shape of an eye, is detected to detect a face by utilizing a statistical analysis. A plurality of these methods may be combined to enhance the precision of the face detection. In the present exemplary embodiment, a high-frequency component in the image is extracted to obtain a size of a face, and a position of eyes is compared to a template, which is prepared beforehand, so that the face is detected.

In step S205, it is determined whether an area (face area) that has high reliability of being a face is detected as a result of the face detection in step S204. When one or more face areas are detected (YES in step S205), the processing proceeds to step S206. When there is no face area (NO in step S205), the processing for detecting the characteristic amount is ended.

Figure 3:
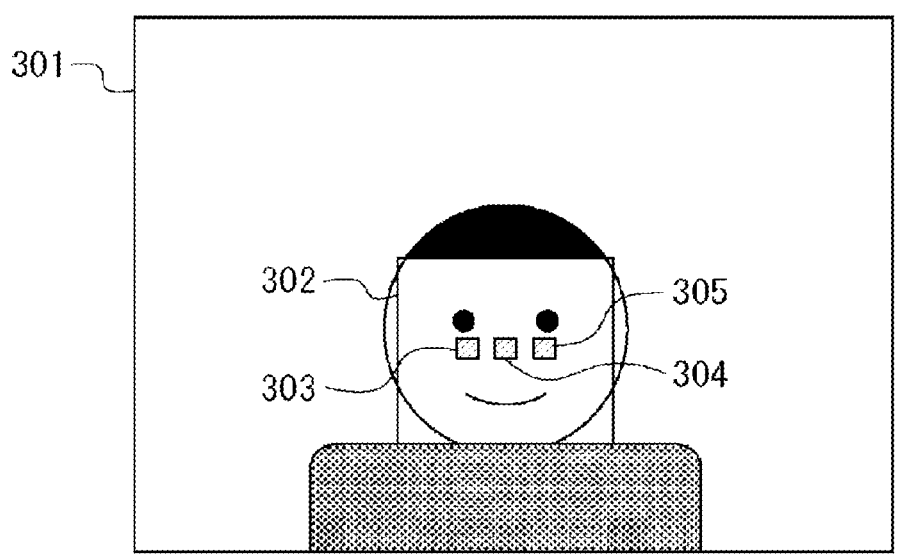
FIG. 3 is a conceptual diagram of a face brightness acquiring area of a detected face.

In step S206, a face brightness acquiring area is calculated. The face brightness acquiring area is set to a part of the face area. For example, the face brightness acquiring areas are set at three portions, such as the portions below both eyes, and the portion at the middle of the eyes as illustrated in FIG. 3, and the size of each area is calculated according to the size of the detected face. In the present exemplary embodiment, the area is square. FIG. 3 includes a range of image data 301, a face area 302, and face brightness acquiring areas 303, 304 and 305.

In step S207, an average values of each of R pixel, G pixel, and B pixel in the input image is obtained for each of the face brightness acquiring areas, and the obtained value is converted into a brightness (luminance) value Y according to a formula 1.

$$Y = 0.299*R + 0.587*G + 0.114*B \quad \text{(Formula 1)}$$

An approximation described in a formula 2 may be employed for the conversion.

$$Y = (3*R + 6*G + B)/10 \quad \text{(Formula 2)}$$

In step S208, a representative value of the brightness of the face is calculated. For example, the maximum value of the brightness values at three portions of each face is obtained, and an average value of the brightness values of all faces is calculated.

The characteristic amount of the image detected as described above is temporarily stored in the memory 107 in FIG. 1.

Figure 4:
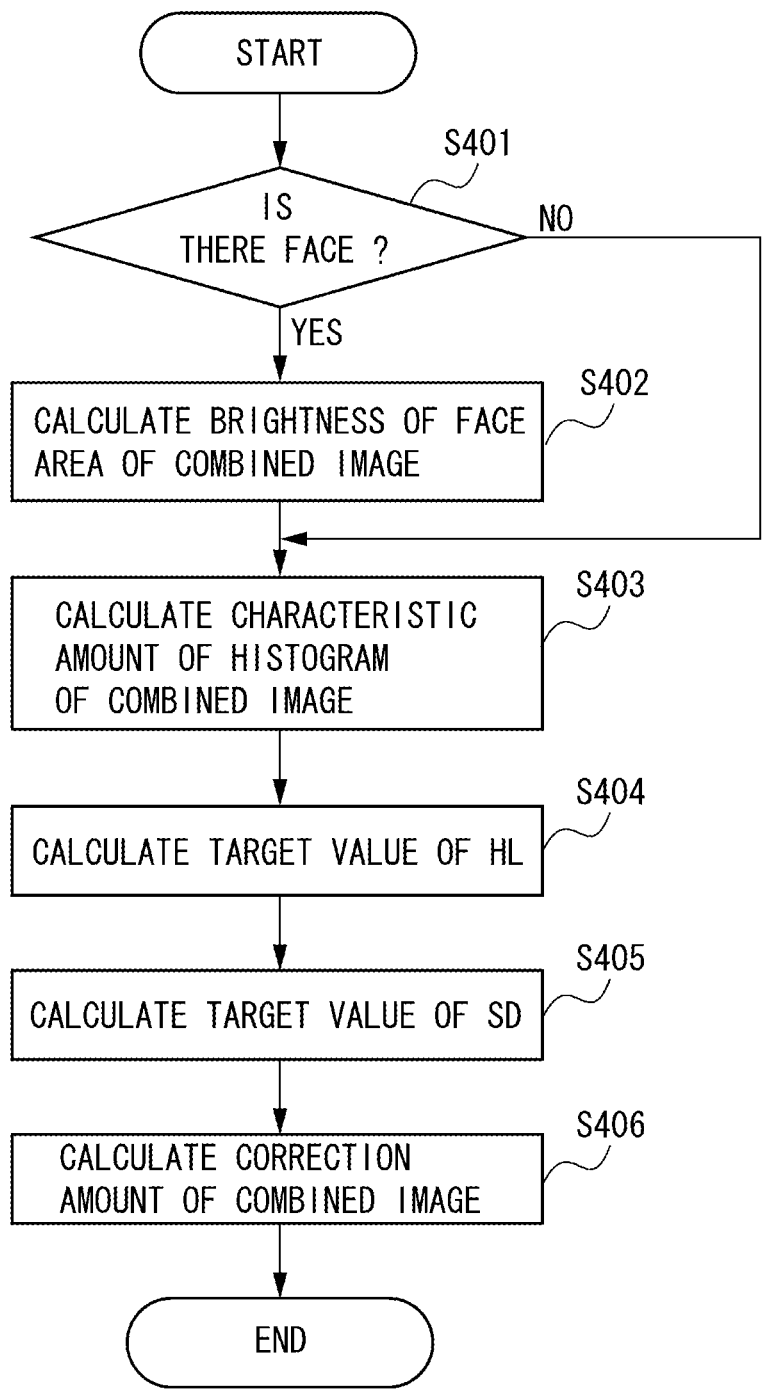
FIG. 4 is a flowchart of processing of calculating a tone correction amount.

Next, the flow of the calculation of the tone correction amount at the correction amount calculation unit 109 will be described with reference to the flowchart in FIG. 4.

In step S401, it is determined whether there is the image in which the face area is detected among the accumulated images. If the image in which the face area is detected is present (YES in step S401), the processing proceeds to step S402, and if not (NO in step S401), the processing proceeds to step S403.

In step S402, a brightness of the area corresponding to the face area of the combined image is detected. The brightness is detected by detecting the brightness value of the corresponding area. The calculation method of the brightness value may be the same as the calculation method of the brightness value of each captured image described above.

In step S403, the characteristic amount of the histogram of the combined image is calculated. The calculation method may be the same as the calculation method of the characteristic amount of the histogram of each captured image. In the present exemplary embodiment, HL and SD of the combined image are calculated.

In step S404, a target value of the HL is calculated. In the present exemplary embodiment, the greatest value of the HL of each of the captured images is defined as the target value.

In step S405, a target value of the SD is calculated. In the present exemplary embodiment, the smallest value of SD of each of the captured images is defined as the target value. The target values of the HL and SD are not limited to the values satisfying a condition used in the present exemplary embodiment, but can appropriately be changed. For example, the brightness distribution of the image data having the highest contrast among the plurality of captured images may be defined as the target value, or the average value of HLs and the average value of SDs of the respective captured images may be calculated to be defined as the target value.

In step S406, the correction amount of the combined image is calculated. When there is no image in which the face area is detected, the brightness values corresponding to the SD and HL of the combined image are approximated to the target values of SD and HL calculated in steps 404 and 405. The SD and HL may be corrected to the precise target value. However, there may be the case in which the contrast is too great, so that the brightness is corrected to be the half-brightness of the SD and HL of the combined image and the target SD and HL in the present exemplary embodiment. A look-up table of the output brightness value to the input brightness value is created from the respective points of the SD and HL and the minimum value and the maximum value of the brightness of the image according to a spline interpolation.

Figure 5:
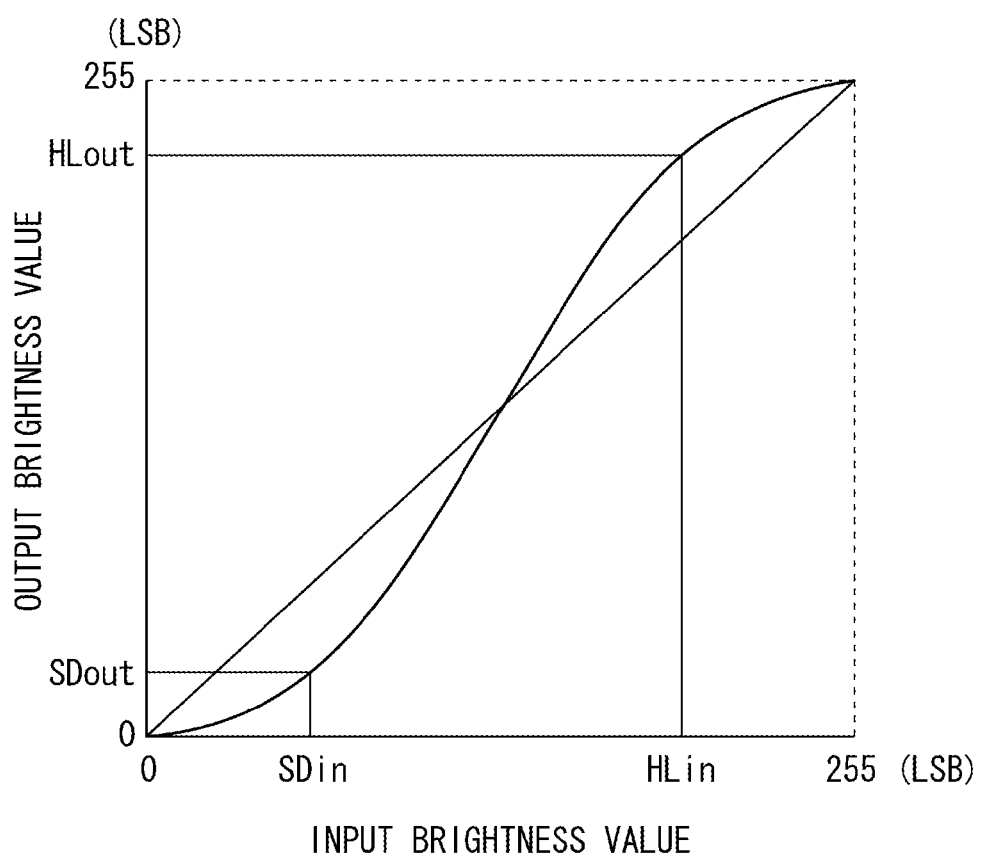
FIG. 5 is a conceptual diagram of a tone correction amount when a face is not detected.

FIG. 5 illustrates one example of a tone curve obtained by the above described processing. SDin and HLin in FIG. 5 correspond to the SD and HL of the combined image, while SDout and HLout correspond to the output values according to the tone correction of the brightness.

When there is a face in which the face area is detected, the correction is made such that the brightness value of the area corresponding to the face area of the combined image is made close to the preferable brightness value for the face. More specifically, the correction amount for the representative value of the brightness at the face area before the combining processing is prepared as a look-up table. In this case, amendment is made such that the correction to the SD and HL is attenuated more than the correction when the image in which the face area is detected is not present, in conjunction with the correction amount of the brightness of the face, in order that the correction does not become unnatural with the correction amount of the SD and HL. Then, the look-up table of the output brightness value to the input brightness value is created by the spline interpolation from the respective points of the SD, HL, and the brightness of the face and the minimum value and the maximum value of the brightness of the image.

Figure 6:
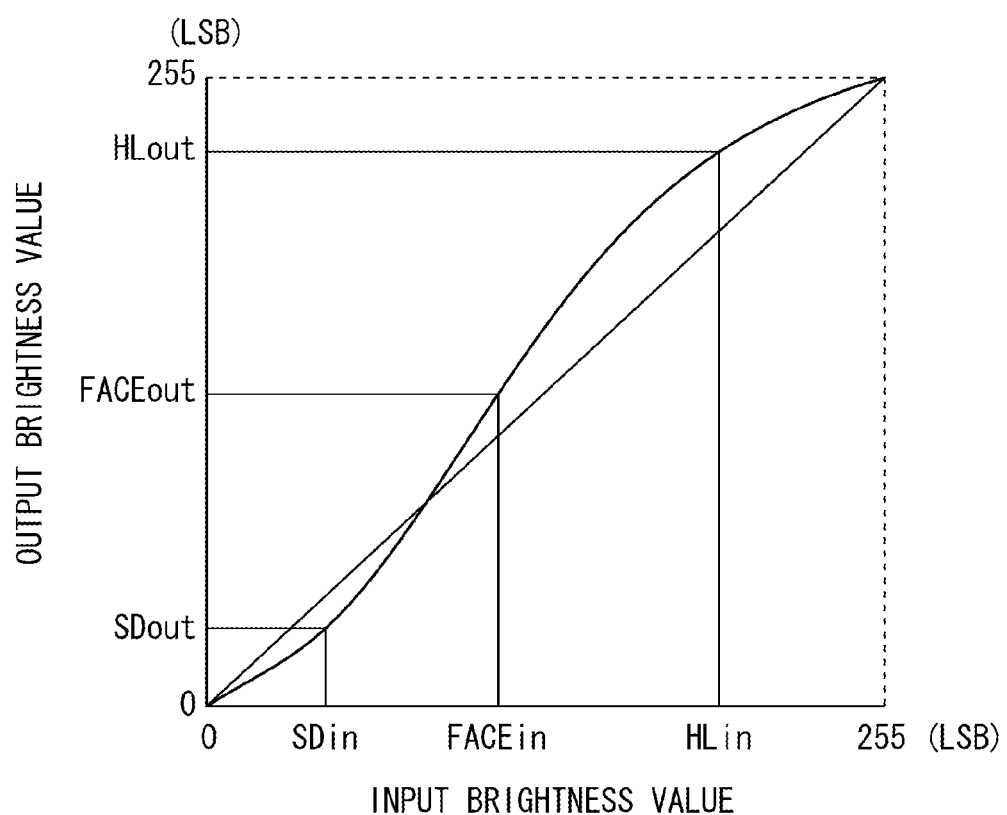
FIG. 6 is a conceptual diagram of a tone correction amount when a face is detected.

FIG. 6 illustrates one example of a tone curve obtained by the above described processing. FACEin in FIG. 6 indicates the representative value of the brightness in the face area after the combining processing, and FACEout indicates the output brightness value thereof.

According to the exemplary embodiment of the present invention, when a plurality of images of the subject are captured and combined, the tone correction can be executed to form a combined image having an appropriate brightness and contrast.

In the present exemplary embodiment, the brightness values at a dark portion and a bright portion of each image are detected and used as the data for obtaining the tone correction amount of the combined image. However, the tone correction may be executed according to a ratio of pixels which are brighter than the brightness value HLth and a ratio of pixels which are darker than the brightness value SDth in the brightness histogram of each detected image. When the brightness value is supposed to be 0 to 255 least significant bits (LSBs), the HLth is defined as 240 LSBs, and the SDth is defined as 15 LSBs, for example. As described above, the present invention is applicable to the processing in which the tone correction amount to the combined image is calculated utilizing the distribution of the brightness histogram of each image to be combined.

In the present exemplary embodiment, the brightness histogram of each image to be combined is used as original data for calculating the tone correction amount to the combined image. However, the histogram of G of each image, for example, may be used as information corresponding to the brightness information. In this case, the G data may be acquired as it is from the R, G, and B data pieces, which are the outputs from the A/D conversion unit 102, and the characteristic amount thereof may be calculated in the characteristic amount detection unit 104.

In the present exemplary embodiment, the gain of the white balance is integrated for each of the captured images, and then, these image data pieces are combined. However, after the image data pieces are combined, the representative gain of the white balance may be integrated.

In the present exemplary embodiment, the characteristic amount of the histogram is detected from the combined image data. However, the characteristic amount of the histogram of the combined image may be calculated from the plurality of captured image data pieces before the combining processing.

In the present exemplary embodiment, a series of the image combining processing is executed by the CPU 100. However, a part of the processing may be executed by hardware such as a circuit.

In the present exemplary embodiment, a digital camera is illustrated as one example of the image processing apparatus, and the image data input from the image sensor 101 which takes an external light flux and converts the light flux into an image signal, is used as the image data. However, the image data input from an image reading unit that reads an image by a scanning optical system, or the image data input from an interface unit that acquires externally obtained image data and inputs the image data into the apparatus, may be used as the image data. More specifically, examples of the possible image processing apparatus include a camera or a video camera to which an image sensor is mounted, a printer, a scanner, or a copying machine to which an image reading unit is mounted, and a computer to which an interface unit that inputs image data obtained from an external recording media is mounted.

Further, the present invention can be achieved in such a manner that a storage medium that records a program code of software for realizing the functions of the exemplary embodiment is supplied to a system or an apparatus, and a computer (CPU, micro-processing unit (MPU), or the like) in the system or the apparatus reads the program code stored in the storage medium and executes the program code.

In this case, the program code itself read from the storage medium realizes the novel function of the present invention, and the storage medium storing the program code and the program constitute the present invention. Examples of the storage medium for supplying the program code include a flexible disk, hard disk, optical disk, magnetic optical disk, compact disk read-only memory (CD-ROM), compact disk recordable (CD-R), compact disk rewritable (CD-RW), digital versatile disk read-only memory (DVD-ROM), digital versatile disk random access memory (DVD-RAM), digital versatile disk rewritable (DVD-RW), digital versatile disk recordable (DVD-R), magnetic tape, non-volatile memory card, ROM, and the like.

The present invention includes not only the case in which the functions of the exemplary embodiment are realized by executing the program code read by the computer, but also the case in which an operating system (OS) operated on the computer executes a part of or entire processing based on an instruction from the program code, and the functions of the exemplary embodiment are realized by the processing described above.

Further, the present invention also includes the case in which the program code read from the storage medium is written in a memory provided to a function extension hoard inserted into the computer or in a memory provided to a function extension unit connected to the computer, and then, a CPU or the like provided to the function extension board or the function extension unit executes a part of or entire processing based on the instruction from the program code, and the functions of the exemplary embodiment are realized by the processing described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-112788 filed May 7, 2009, which is hereby incorporated by reference herein in its entirety.

The invention claimed is:

1. A method for image processing for obtaining a combined image data by combining a plurality of image data obtained by a plurality of times of image capturing, the method comprising:
   detecting brightness distribution for each of the plurality of image data and the combined image data;
   calculating a characteristic amount of each detected brightness distribution;
   calculating a target value of the characteristic amount of the brightness distribution of the combined image data from the characteristic amount, wherein the target value is the characteristic amount of the brightness distribution of the image data which has a highest contrast among the plurality of image data, and includes both a target value of the characteristic amount of a dark side of the brightness distribution and a target value of the characteristic amount of a bright side of the brightness distribution; and
   acquiring a correction amount for a tone correction executed to the combined image data based on the obtained target value.

2. The method according to claim 1, further comprising:
   detecting an area in which a face is present for each of the plurality of image data;
   calculating a characteristic amount of a face area detected in the plurality of image data and a characteristic amount of an area corresponding to the face area in the combined image data; and
   acquiring a tone correction amount of the area corresponding to the face area in the combined image data based on the characteristic amount of the face area in the plurality of image data.

3. An image processing apparatus that obtains a piece of combined image data by combining a plurality of image data obtained from an image input unit by a plurality of times of image capturing, comprising:
   a brightness distribution detection unit configured to detect brightness distribution for each of the plurality of image data and the combined image data;
   a characteristic amount calculation unit configured to calculate a characteristic amount of each detected brightness distribution;
   a target value calculation unit configured to calculate a target value of the characteristic amount of the brightness distribution of the combined image data from the characteristic amount, wherein the target value is the characteristic amount of the brightness distribution of the image data which has a highest contrast among the plurality of image data, and includes both a target value of the characteristic amount of a dark side of the brightness distribution and a target value of the characteristic amount of a bright side of the brightness distribution; and
   a correction amount acquisition unit configured to acquire a tone correction amount used for a tone correction executed to the combined image data based on the target value obtained in the target value calculation unit.

4. The image processing apparatus according to claim 3, wherein the image input unit includes an image sensor that externally takes a light flux and converts the light flux into an image signal, an image reading unit that reads an image by a scanning optical system, or an interface unit that externally acquires image data and inputs the same into the apparatus.

5. A non-transitory computer readable medium that stores a program for causing a computer to execute a method for image
   processing for obtaining a combined image data by combining a plurality of image data obtained by a plurality of times of image capturing, the program comprising:
   detecting brightness distribution for each of the plurality of image data and the combined image data;
   calculating a characteristic amount of each detected brightness distribution;
   calculating a target value of the characteristic amount of the brightness distribution of the combined image data from the characteristic amount, wherein the target value is the characteristic amount of the brightness distribution of the image data which has a highest contrast among the plurality of image data, and includes both a target value of the characteristic amount of a dark side of the brightness distribution and a target value of the characteristic amount of a bright side of the brightness distribution; and
   acquiring a correction amount for a tone correction executed to the combined image data based on the obtained target value.

* * * * *